United States Patent Office 3,031,430
Patented Apr. 24, 1962

3,031,430
METAL CARBIDE CONTAINING SILICONE RUBBERS
William J. Bobear, Latham, N.Y., assignor to General Electric Company, a corporation of New York
No Drawing. Filed Dec. 10, 1959, Ser. No. 858,600
7 Claims. (Cl. 260—37)

The present invention relates to improved silicone rubber compositions and to a process of making them. Specifically, the present invention relates to the use of certain metal carbides for the production of silicone rubber compositions having improved resistance to reversion.

Prior to the present invention, the superior performance of silicone rubber was generally recognized in mechanical and electrical applications requiring materials having high heat stability over wide temperature ranges. In certain applications, however, involving sealed systems wherein silicone rubber is employed in the form of O-ring seals and gaskets, such as in aircraft and diesel engines, the desirable properties of the silicone rubber materials are often adversely affected at elevated temperatures due to the peculiar nature of the organopolysiloxane polymer. It has long been known, for example, that when silicone rubber is sealed in a closed system at elevated temperatures, in the presence of occluded water, or water-containing substances such as certain filler materials, a softening of the rubber occurs which is commonly referred to as revision. One explanation advanced is that scission reaction or reactions occur in the organopolysiloxane polymer. Reversion of the rubber may be further recognized by drastic changes in hardness, tensile strength and elongation. In other words, the desirable properties of the organopolysiloxane rubber material are adversely affected.

It has now been discovered that silicone rubber compositions can be made with improved reversion resistance by adding to the rubber during the milling stages, certain water reactive metal carbides, i.e., metal carbides that react with water to produce byproducts, including metal oxides and hydrocarbons.

The discovery that these metal carbides would be so effective in reducing reversion in silicone rubber was quite unexpected, since the addition of certain metallic ions to silicone rubber compositions often increases reversion by catalytic action.

In accordance with the present invention, therefore, there is provided a silicone rubber composition having improved resistance to reversion comprising (1) 100 parts of organopolysiloxane (2) 0 to 100 parts of filler (3) 1 to 100 parts of a water reactive metal carbide selected from the group of aluminum carbide, beryllium carbide, manganese carbide, magnesium carbide and mixtures of said carbides, said filler and said water reactive metal carbide being present together in said rubber composition in a range of from about 10 to 200 parts per 100 parts weight of the organopolysiloxane, and said organopolysiloxane having a viscosity of at least 100,000 centipoise when measured at 25° C., in which the organo groups are monovalent hydrocarbon, halogen substituted monovalent hydrocarbon and cyanoalkyl groups, said organo groups being attached to silicon by carbon silicon linkages, there being an average of about 1.98 to 2.05 organo groups per silicon atom.

Highly reactive metal carbides such as alkali metal carbides, i.e., sodium and potassium are not operable in the present invention because the reaction of alkali metal carbides with water is highly exothermic. In addition the reaction residues of alkali metal carbides are highly basic and thus detrimental to the organopolysiloxane polymer. The preferred metal carbides therefore are those that are only slightly reactive with water at room temperature such as aluminum carbide, $Al_4C_3$ and beryllium carbide, $Be_2C$.

In addition to serving as reversion inhibitors for silicone rubbers, the water reactive metal carbides of mixtures thereof included within the present invention perform ideally as filler materials for silicone rubber compositions when reduced to a range in particle size of 1 to 50 microns and preferably 1 to 20 microns. The more reactive metal carbides, such as calcium carbide, are preferably employed in limited amounts, such as up to a weight range of about 10 percent by weight of the filler employed during the milling of the organopolysiloxane to avoid excessive heat due to possible exothermic reactions.

The fillers that are employed with the metal carbides of the present inveniton in preparing the novel improved reversion resistant organopolysiloxane compositions, are known to the art as reinforcing, and semireinforcing fillers. The reinforcing fillers, such as the silica fillers, including fumed silica, precipitated silica and the like, are structure inducing and depending on their manufacture, may contain or be free of hydroxyl groups either in the form of adsorbed moisture or bonded to silicon atoms. These structure inducing silicone rubber fillers may be modified such as, for example, by the introduction of silicone-bonded alkoxy groups in place of some hydroxyl groups, resulting in some advantages as decreased structure when incorporated with a convertible organopolysiloxane composition.

The preferred silica filler of the present invention is a fumed silica filler made by fuming processes including the vapor phase burning of silicon tetrachloride or ethylsilicate, an example being what is known to the trade as Cab-O-Sil. Since a fumed silica contains a relatively low degree of moisture, it is particularly valuable as a filler additive in electrical applications, requiring a high resistance to reversion. Examples of other silica reinforcing fillers may be found described in U.S. Patents 2,541,137, 2,610,167 and 2,657,149. Such fillers may be slightly acidic or alkaline (that is, have pH's below or above 7) depending upon the method of manufacture, such as by an aerogel process. Examples of semi-reinforcing or usually non-structure forming type, are titanium oxide, lithopane, calcium carbonate, iron oxide, and diatomaceous earth.

The amount and type of filler and carbide used in combination with the organopolysiloxanes in preparing the novel reversion resistant rubber compositions of the present invention can obviously be varied within wide limits. For example, a range of about from 10 to 200 parts of carbide-filler mixture per 100 parts by weight of the organopolysiloxane is operable in the present invention. The filler in the carbide filler mixture can vary over a range of 0 to 100 parts while the metal carbide can vary from 1 to 100 parts preferably 1 to 20 parts. The metal carbides employed in the practice of the present invention can also be employed as mixtures with each other in all proportions by weight.

The convertible organopolysiloxanes used in connection with this invention can be viscous masses or gummy solids depending upon the state of condensation of the starting organopolysiloxanes, polymerizing agent, etc. and will hereinafter for convenience be referred to as "convertible organopolysiloxanes." Although the convertible organopolysiloxanes used in the present invention are well known in the art, attention is directed to the convertible organopolysiloxanes disclosed in Agens Patent 2,448,756 and Sprung et al. Patent 2,448,556, the latter two patents being issued September 7, 1948, Sprung Patent 2,484,595 issued October 11, 1949; Krieble et al. Patent 2,457,688 issued December 28, 1948; Marsden Patent 2,521,528 issued September 5, 1950—all the foregoing patents being assigned to the same assignee as the present invention; Hyde Patent 2,490,357 issued December 5, 1949; and Warrick Patent 2,541,137 issued February 13, 1951. It will, of course, be understood by those skilled in the art that the convertible organopolysiloxanes referred to herein contain the same or different silicon-bonded organic substituents (e.g., methyl, ethyl, propyl, vinyl, allyl, phenyl, tolyl, xylyl, benzyl, phenylethyl, naphthyl, chlorophenyl, cyanoethyl, both methyl and phenyl, etc. radicals) connected to the silicon atoms by carbon-silicon linkages, may be employed in the present invention without departing from the scope of this invention.

The particular convertible organopolysiloxanes used are not critical and may be any one of those described in the foregoing patents. They may be viscous masses or gummy solids depending upon the state of condensation of the starting organopolysiloxanes, polymerizing agent, etc., and may be prepared by condensation of a liquid organopolysiloxane containing an average of about 1.95, preferably from about 1.98 to about 2.05 organic groups per silicon atom. The polymerizing agents that can be employed are well known in the art and can include, for instance, ferric chloride hexahydrate, phenyl phosphoryl chloride; alkaline condensing agents such as potassium hydroxide, sodium hydroxide, etc. Each convertible organopolysiloxane generally comprises a polymeric diorganosiloxane which can contain, if desired, for example, up to 2 mol percent copolymerized monoorganosiloxane, for example, copolymerized monomethylsiloxane and a small molar (e.g., less than 1 mol) percent of triorganosiloxy units, e.g., trimethylsiloxy units. Generally, it is preferred to use as the starting liquid organopolysiloxanes (or mixtures of organopolysiloxanes) from which the convertible organopolysiloxanes are prepared, ones which contain about 1.999 to 2.01, inclusive, organic groups, for example, methyl groups per silicon atom, and where preferably more than 50 percent, e.g., more than 75 percent, of the silicon atoms in the polysiloxane contain two silicon-bonded lower alkyl groups. The convertible organopolysiloxane thus prepared also advantageously contains silicon atoms to which at least 50 percent of the hydrocarbon groups attached thereto are lower alkyl radicals, e.g., methyl radicals.

The starting organopolysiloxanes used to make the convertible organopolysiloxanes advantageously comprise organic constituents consisting essentially of monovalent organic radicals attached to silicon by carbon-silicon linkages, and in which essentially all the siloxane units consist of units of the structural formula $R_2SiO$, where R is preferably a radical of the group consisting of methyl and phenyl radicals. At least 50 to 75 percent of the total number of R groups are preferably methyl radicals. The polysiloxane can be one in which all the siloxane units are $(CH_3)_2SiO$, or the siloxane can be a copolymer of dimethylsiloxane with a minor amount (e.g., from 1 to 20 or more mol percent) of any of the following units, separately or mixtures thereof: $C_6H_5(CH_3)SiO$ and $(C_6H_5)_2SiO$. The presence of halogen, e.g., chlorine, atoms on the phenyl nucleus is also within the purview of the present invention.

Where alkenyl groups are attached to silicon by carbon-silicon linkages, it is preferable that the alkenyl groups (for instance, vinyl groups, allyl groups, etc.) be present in an amount equal to from 0.05 to 2 mol percent of the total number fo silicon bonded organic groups in the convertible organopolysiloxane.

Various curing agents to effect more rapid conversion of the convertible organopolysiloxane to the cured, solid, elastic state can be incorporated. Among such curing agents can be mentioned, for instance, benzoyl peroxide, tertiary butyl perbenzoate, bis-(2,4-dichlorobenzoyl) peroxide, etc. These curing agents (or "vulcanization accelerators" as they are often designated) can be present in amounts ranging from about 0.1 to as high as 4 to 8 percent or more, by weight, based on the weight of the convertible organopolysiloxane. High energy electron irradiation without curing agents can also be employed for vulcanizing purposes.

The metal carbides or mixtures thereof can be incorporated in the convertible organopolysiloxane formulation in any desired manner. It is preferred to initially grind the carbide to reduce its particle size to 50 microns or below to avoid possible modification of the desirable properties of the final cured product. Although the metal carbide or mixtures thereof can be incorporated into the organopolysiloxane formulation at any stage of the processing, it is generally preferable to include it prior to the addition of the curing catalyst. One convenient way, for example, is to add the metal carbide along with the filler while milling the organopolysiloxane.

The addition of a suitable curing agent can be performed at any stage of the processing but it is preferred to add it after mixing the organopolysiloxane gum with the filler and the metal carbide. Thereafter, the composition can be molded or used in any application desired. When molding the curable organopolysiloxane formulation, pressures from about 100 to 2000 p.s.i. or more may be employed in combination with temperatures ranging from about 80° C. to 200° C. or higher. Under such conditions, the time required for effecting the desired cure will depend upon such factors as the type of curing agent, concentration thereof, the type of organopolysiloxane, the type and amount of filler and the metal carbide, the use desired, etc. Persons skilled in the art will have little difficulty in determining the optimum additives under various situations involving a variety of temperatures, proportions and ingredients.

The following is illustrative of the preparation of stock materials employed in the examples illustrating the practice of the invention.

A convertible organopolysiloxane was prepared by heating one hundred parts of octamethylcyclopolysiloxane to a range of 110° C. to 155° C. while agitating the mass with 0.001 part by weight of potassium hydroxide for about 4 hours, to obtain a highly viscous benzene-soluble mass of only slight flow. This material had a ratio of approximately 2 methyl groups per silicon atom and had a viscosity of about 6 million centistokes.

Commercially available aluminum carbide $Al_4C_3$ was ground to a particle size of about 40 microns and was employed as the carbide additive.

In order that those skilled in the art may better understand how the present invention can be practiced, the following examples are given by way of illustration and not by way of limitation. All parts are by weight.

EXAMPLE 1

100 parts of a convertible organopolysiloxane and 4 parts of diphenylsilanediol were placed in a Banbury mixer and a mixture of 40 parts of fumed silica and 4 parts of aluminum carbide were gradually added. The formulation was milled for 1 hour at 130° C. to 150° C. under pressure of 30 p.s.i. gauge. The resulting composition was placed in a two-roll mill and 3 parts of benzoyl peroxide were added. After 24 hours the slabs were then cut from a sheet formed by milling the composition further, and the slabs were press-cured for 10 minutes at 125° C. and then post-cured for one hour at 150° C. and 24 hours at 250° C. Test samples were then prepared by cutting the slab into ½″ x 4″ x 0.075″ strips.

EXAMPLE 2

The procedure of Example 1 was repeated, except that 8 parts of aluminum carbide were employed in preparing test strips of the compositions of the present invention.

EXAMPLE 3

A similar formulation was made according to the procedure of Example 1, but 12 parts of aluminum carbide were used in the filler mixture. Test strips were prepared with the resulting composition following the method of Example 1.

Control strips were made by employing the same procedure used in the examples but the aluminum carbide was omitted. The formulation comprised 100 parts of convertible organopolysiloxane, 4 parts of diphenylsilanediol and 40 parts of fumed silica filler.

The control strips and the cured strips of the compositions of the present invention were then subjected to the following conditioning treatments to determine their reversion resistance.

*Treatment A*

Test strips of the controls and compositions of Example 2 were exposed for one week at a temperature in the range of 25° C. and a relative humidity of about 40 to 60 percent.

*Treatment B*

Test strips of the controls and the compositions of Examples 1 and 3 were placed in a desiccator containing a saturated solution of sodium chloride for one week. The average temperature was 25° C. and the relative humidity was 75 percent.

After the test strips of the examples and the controls were conditioned according to the methods A and B above, measurements were made with the strips according to ASTM specifications as shown in Table I below. Hardness (H), tensile strength (T), elongation (E) and final toughness (FT) were determined based on the average of four strips in each case.

TABLE I

| Test Strips/(parts of Al$_4$C$_3$) | H | T | E | FT [1] | Conditioning Treatment |
|---|---|---|---|---|---|
| 1. Ex. 1 (4) | 60 | 730 | 190 | 69 | B |
| 2. Ex. 2 (8) | 72 | 610 | 130 | 39.6 | A |
| 3. Ex. 3 (12) | 63 | 600 | 150 | 49.5 | B |
| 4. Control A (0) | 72 | 725 | 160 | 58 | A |
| 5. Control B (0) | 63 | 615 | 160 | 49.2 | B |

[1] $FT = \frac{\frac{1}{2} \text{Tensile Strength} \times E}{1000}$

After having been conditioned according to Treatment A and B above, the control strips and the compositions of the present invention were sealed in glass tubes (4 strips ½" x 4" x 0.075" in each tube). The sealed tubes were then placed in an oven for 24 hours at a temperature of 250° C. After this heat treatment under sealed conditions, the test strips of the controls and the compositions of the present invention were again measured for hardness, tensile strength, elongation and final toughness to determine whether there were any changes in properties due to possible reversion. Table II illustrates the changes in properties noted based on the average value of the four strips in each tube after the heat treatment of 24 hours at 250° C. while sealed.

TABLE II

| Test Strips | H | T | E | FT |
|---|---|---|---|---|
| 1. Ex. 1 | 47 | 177 | 210 | 18.6 |
| 2. Ex. 2 | 64 | 410 | 110 | 22.6 |
| 3. Ex. 3 | 50 | 292 | 170 | 24.8 |
| 4. Control A | 58 | 265 | 120 | 15.9 |
| 5. Control B | 42 | 126 | 130 | 8.2 |

The marked superiority of the compositions of the present invention over the controls in resisting reversion can be more fully appreciated if the data of Table I and Table II are compared and evaluated. Table I, for example, represents the average ASTM values of the test strips of the controls and the compositions of the present invention that were taken after the respective sample strips had been conditioned for one week by either conditioning treatment A or B. These conditioning treatments, moreover, particularly treatment B, involving a relative humidity of 75 percent over a period of one week are extreme, and much more severe than would be experienced under actual operating conditions. This is evident from the drastic drop in final toughness, due to reversion, of control B, from 49.2 in Table I, to 8.2 in Table II, as a result of the heat sealing treatment. Test strips of Examples 1 and 3, however, which were also exposed to conditioning treatment B, appeared to fare much better with final values of 18.6 and 22.6 respectively.

Table III illustrates more dramatically the positive performance of the compositions of the present invention in resisting reversion by evaluating the data of Table I and Table II in terms of percent changes. Examples 1 and 3 are compared with control B and Example 2 with control A in view of the similarity of prior conditioning as shown in Table I.

TABLE III

| Test Strips/(parts of Al$_4$C$_3$) | Percent Changes (Sealed 24 hrs. at 250° C.) | | | |
|---|---|---|---|---|
| | H | T | E | FT |
| 1. Ex. 1 (4) | −21.5 | −75.8 | +10.5 | −73 |
| 2. Ex. 3 (12) | −21 | −56 | +13.3 | −50 |
| 3. Control B | −33 | −79.5 | −19 | −83.5 |
| 4. Ex. 2 (8) | −11 | −33 | −15 | −43 |
| 5. Control A | −20 | −65 | −25 | −73 |

The above values clearly demonstrate the superior properties of the composition of the present invention. If a further comparison is made between the changes in average value of the test strips of Example 3 and the strips of Control A, particularly in view of drastic conditioning treatment B which was applied to the strips of Example 3 containing 12 parts of aluminum carbide, there should be little question as to the outstanding superiority of the compositions of the present invention in resisting reversion.

As a result of this discovery silicone rubbers having superior resistance to reversion are now available to the art. These improved rubber compositions are ideally suitable for a variety of electrical and mechanical applications requiring sealed rubber components that are subject to extremes in temperature.

What I claim as new and desire to secure by Letters Patent of the United States is:

1. A rubber composition having improved resistance to reversion comprising, by weight, (1) 100 parts of organopolysiloxane, (2) 0–100 parts of filler, (3) 1–100 parts of a metal carbide selected from the group consisting of aluminum carbide, beryllium carbide, manganese carbide, magnesium carbide and mixtures thereof, said filler and said metal carbide being present together in said rubber composition in a range of from 10 to 200 parts per 100 parts by weight of the organopolysiloxane, and said organopolysiloxane having a viscosity of at least 100,000 centipoise when measured at 25° C., in which the organo groups are members selected from the group consisting of monovalent hydrocarbon groups, halogen substituted monovalent hydrocarbon groups and cyanoalkyl groups, said organo groups being attached to silicon by carbon silicon linkages, there being an average of about 1.98 to 2.05 organo groups per silicon atom.

2. A composition in accordance with claim 1, wherein the metal carbide is aluminum carbide.

3. A composition in accordance with claim 1, wherein the filler is fume silica.

4. A composition in accordance with claim 1, wherein the monovalent hydrocarbon groups of the organopolysiloxane consist essentially of methyl groups.

5. A composition in accordance with claim 1, wherein the metal carbide is present in a range of about 1 to 20 percent based on the weight of the organopolysiloxane.

6. A composition in accordance with claim 1, wherein the metal carbide has a particle size of from about 1 to 20 microns.

7. A process for making an organopolysiloxane rubber having improved reversion resistance comprising curing a composition containing, by weight, (1) 100 parts of organopolysiloxane, (2) 0–100 parts of filler, and (3) 1–100 parts of a metal carbide selected from the group consisting of aluminum carbide, beryllium carbide, manganese carbide, magnesium carbide and mixtures thereof and (4) a curing agent at temperatures in the range of from about 80° C. to 200° C., said filler and said metal carbide being present together in said composition in a range of from about 10 to 200 parts per 100 parts by weight of said organopolysiloxane, said organopolysiloxane having a viscosity of at least 100,000 centipoise when measured at 25° C. and in which the organo groups are members selected from the group consisting of monovalent hydrocarbon groups and cyanoalkyl-substituted monovalent hydrocarbon groups, attached to silicon by carbonsilicon linkages, there being an average of from about 1.98 to 2.05 organo groups per silicon atom.

References Cited in the file of this patent

UNITED STATES PATENTS

| | | |
|---|---|---|
| 2,406,275 | Wejnarth | Aug. 20, 1946 |
| 2,559,077 | Johnson et al. | July 3, 1951 |